US006574727B1

United States Patent
Davidson et al.

(10) Patent No.: US 6,574,727 B1
(45) Date of Patent: Jun. 3, 2003

(54) METHOD AND APPARATUS FOR INSTRUCTION SAMPLING FOR PERFORMANCE MONITORING AND DEBUG

(75) Inventors: Joel Roger Davidson, Austin, TX (US); John Edward Derrick, Round Rock, TX (US); Alexander Erik Mericas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,069

(22) Filed: Nov. 4, 1999

(51) Int. Cl.[7] ................................................. G06F 9/00
(52) U.S. Cl. ........................................ 712/227; 703/22
(58) Field of Search ............................. 703/22; 714/35, 714/38; 712/227

(56) References Cited

U.S. PATENT DOCUMENTS

| | | | |
|---|---|---|---|
| 4,231,106 A | 10/1980 | Heap et al. .................. 364/900 |
| 5,151,981 A | 9/1992 | Westcott et al. ............. 395/375 |
| 5,446,876 A | 8/1995 | Levine et al. ............. 395/184.01 |
| 5,493,673 A | 2/1996 | Rindos, III et al. ......... 395/550 |
| 5,528,753 A | 6/1996 | Fortin .................... 395/183.11 |
| 5,557,548 A | 9/1996 | Gover et al. ............ 364/551.01 |
| 5,572,672 A | 11/1996 | Dewitt et al. .......... 395/184.01 |
| 5,748,855 A | 5/1998 | Levine et al. .......... 395/800.23 |
| 5,790,843 A | 8/1998 | Borkenhagen et al. ...... 395/567 |
| 5,809,450 A | 9/1998 | Chrysos et al. ............. 702/186 |
| 5,968,163 A | * 10/1999 | Narayan et al. ............ 712/204 |
| 6,006,030 A | * 12/1999 | Dockser ..................... 712/227 |
| 6,119,075 A | * 9/2000 | Dean et al. ................ 702/186 |
| 6,148,396 A | * 11/2000 | Chrysos et al. ............. 712/216 |

\* cited by examiner

*Primary Examiner*—Eric Coleman
(74) *Attorney, Agent, or Firm*—Duke W. Yee; Mark E. McBurney; Lisa L. B. Yociss

(57) ABSTRACT

A method and apparatus for selecting an instruction to be monitored within a pipelined processor in a data processing system is presented. A plurality of instructions are fetched, and the plurality of instructions are matched against at least one match condition to generate instructions that are eligible for sampling. The match conditions may include matching the opcode of an instruction, the pre-decode bits of an instruction, a type of instruction, or other conditions. The matched instructions may be marked using a match bit that accompanies the instruction through the selection process. The instructions eligible for sampling are then sampled to generate a sampled instruction. A sampled instruction may be marked with a sample bit that accompanies the instruction through the instruction execution process in order to monitor the sampled instruction while it is executing within the pipelined processor.

31 Claims, 5 Drawing Sheets

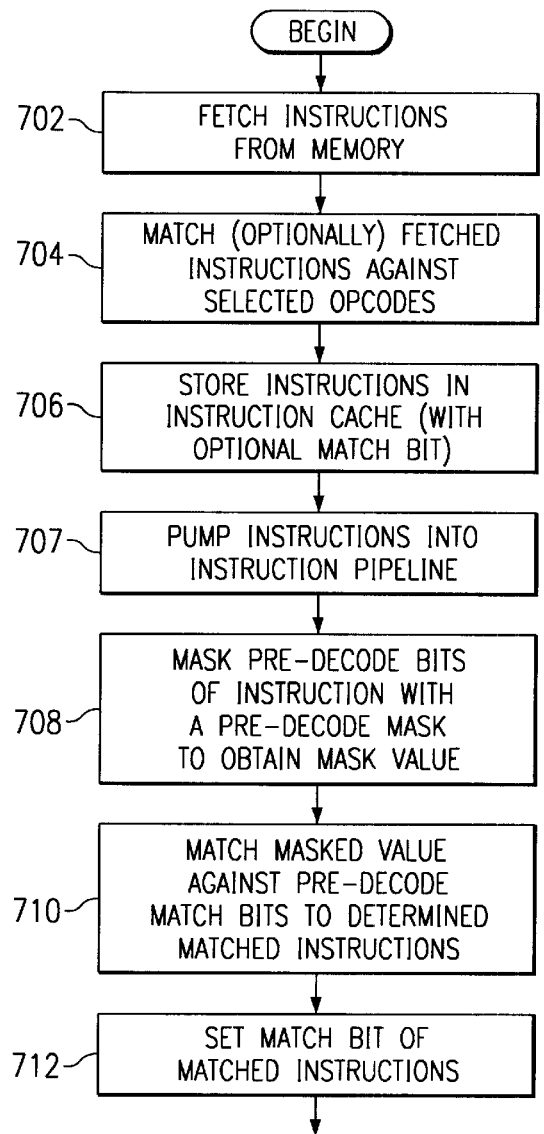
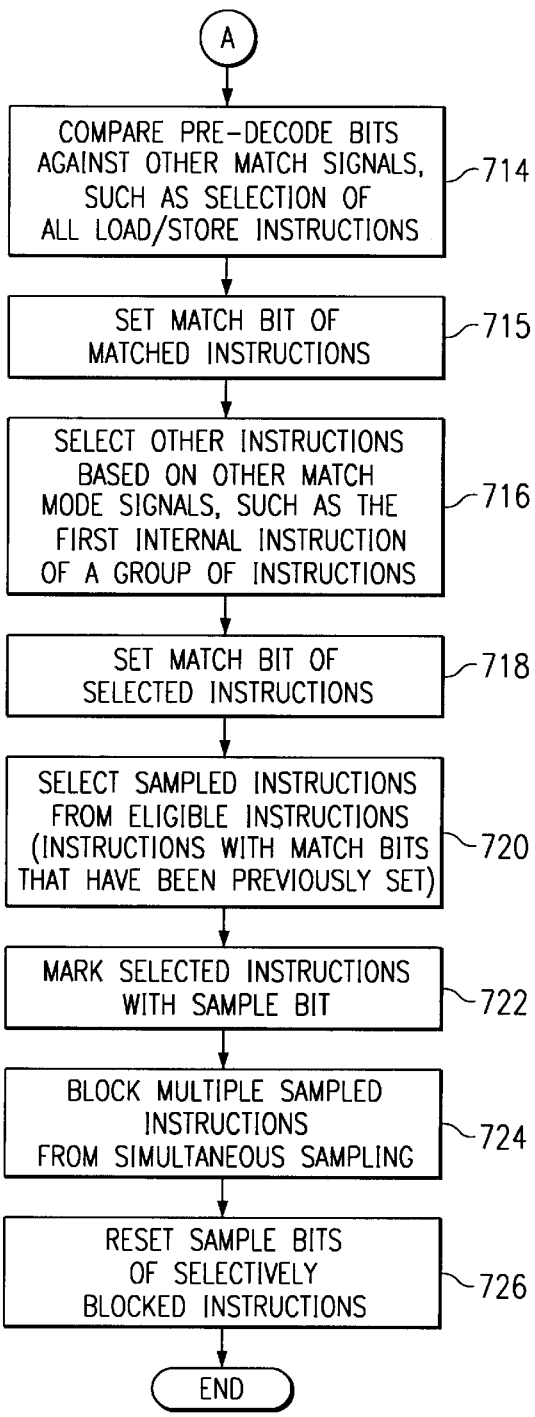
FIG. 7A
FIG. 7B

METHOD AND APPARATUS FOR INSTRUCTION SAMPLING FOR PERFORMANCE MONITORING AND DEBUG

CROSS-REFERENCE TO RELATED APPLICATIONS

The present invention is related to the following applications entitled "METHOD AND APPARATUS FOR IDENTIFYNG INSTRUCTIONS FOR PERFORMANCE MONITORING IN A MICROPROCESSOR", U.S. Application Ser. No. 09/436,109, filed on Nov. 8, 1999; and "METHOD AND APPARATUS FOR PATCHING PROBLEMATIC INSTRUCTIONS IN A MICROPROCESSOR USING SOFTWARE INTERRUPTS", U.S. applicatin Ser. No. 09/436,103, filed on Nov. 8, 1999; all of which are assigned to the same assignee.

BACKGROUND OF THE INVENTION

1. Technical Field

The present invention relates generally to an improved data processing system and, in particular, to a method and system for monitoring instruction execution within a processor in a data processing system.

2. Description of Related Art

In typical computer systems utilizing processors, system developers desire optimization of software execution for more effective system design. Usually, studies are performed to determine system efficiency in a program's access patterns to memory and interaction with a system's memory hierarchy. Understanding the memory hierarchy behavior helps in developing algorithms that schedule and/or partition tasks, as well as distribute and structure data for optimizing the system.

Within state-of-the-art processors, facilities are often provided which enable the processor to count occurrences of software-selectable events and to time the execution of processes within an associated data processing system. These facilities are known as the performance monitor of the processor. Performance monitoring is often used to optimize the use of software in a system. A performance monitor is generally regarded as a facility incorporated into a processor to monitor selected characteristics to assist in the debugging and analyzing of systems by determining a machine's state at a particular point in time. Often, the performance monitor produces information relating to the utilization of a processor's instruction execution and storage control. For example, the performance monitor can be utilized to provide information regarding the amount of time that has passed between events in a processing system. As another example, software engineers may utilize timing data from the performance monitor to optimize programs by relocating branch instructions and memory accesses. In addition, the performance monitor may be utilized to gather data about the access times to the data processing system's L1 cache, L2 cache, and main memory. Utilizing this data, system designers may identify performance bottlenecks specific to particular software or hardware environments. The information produced usually guides system designers toward ways of enhancing performance of a given system or of developing improvements in the design of a new system.

Events within the data processing system are counted by one or more counters within the performance monitor. The operation of such counters is managed by control registers, which are comprised of a plurality of bit fields. In general, both control registers and the counters are readable and writable by software. Thus, by writing values to the control register, a user may select the events within the data processing system to be monitored and specify the conditions under which the counters are enabled.

As one method of monitoring the execution of instructions in a processor, either for monitoring purposes or for debug purposes, a method called instructions sampling has been used. One or more instructions are selected, i.e. sampled, and detailed information about the sampled instruction is collected as the instructions execute. Existing instruction sampling techniques sample an instruction based on the instruction's location in an internal queue, which lacks the granularity or control necessary for robust monitoring of instruction execution.

Therefore, it would be advantageous to have a method and apparatus for accurately monitoring the execution of instructions within a processor. It would be further advantageous to have a method and apparatus for sampling particular types of instructions for monitoring.

SUMMARY OF THE INVENTION

A method and apparatus for selecting an instruction to be monitored within a pipelined processor in a data processing system is presented. A plurality of instructions are fetched, and the plurality of instructions are matched against at least one match condition to generate instructions that are eligible for sampling. The match conditions may include matching the opcode of an instruction, the pre-decode bits of an instruction, a type of instruction, or other conditions. The matched instructions may be marked using a match bit that accompanies the instruction through the selection process. The instructions eligible for sampling are then sampled to generate a sampled instruction. A sampled instruction may be marked with a sample bit that accompanies the instruction through the instruction execution process in order to monitor the sampled instruction while it is executing within the pipelined processor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A–7B is a flowchart depicting a process for selecting a sampled instruction from an instruction stream entering an instruction pipeline in accordance with a preferred embodiment of the present invention.

DETAILED DESCRIPTION OF THE PREFERRED EMBODIMENT

Figure 1:
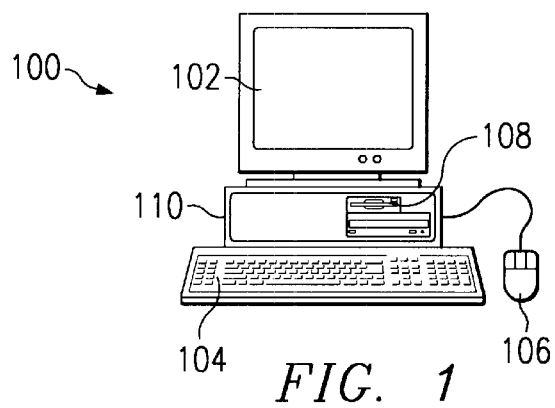
FIG. 1 is a pictorial representation depicting a data processing system in which the present invention may be implemented in accordance with a preferred embodiment of the present invention.

With reference now to FIG. 1, a pictorial representation depicts a data processing system in which the present invention may be implemented in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Computer 100 can be implemented using any suitable computer. Although the depicted representation shows a personal computer, other embodiments of the present invention may be implemented in other types of data processing systems, such as mainframes, workstations, network computers, Internet appliances, hand-held computers, etc. System unit 110 comprises memory, a central processing unit, I/O unit, etc. However, in the present invention, system unit 110 contains a speculative processor, either as the central processing unit or as one of multiple CPUs present in the system unit.

Figure 2:
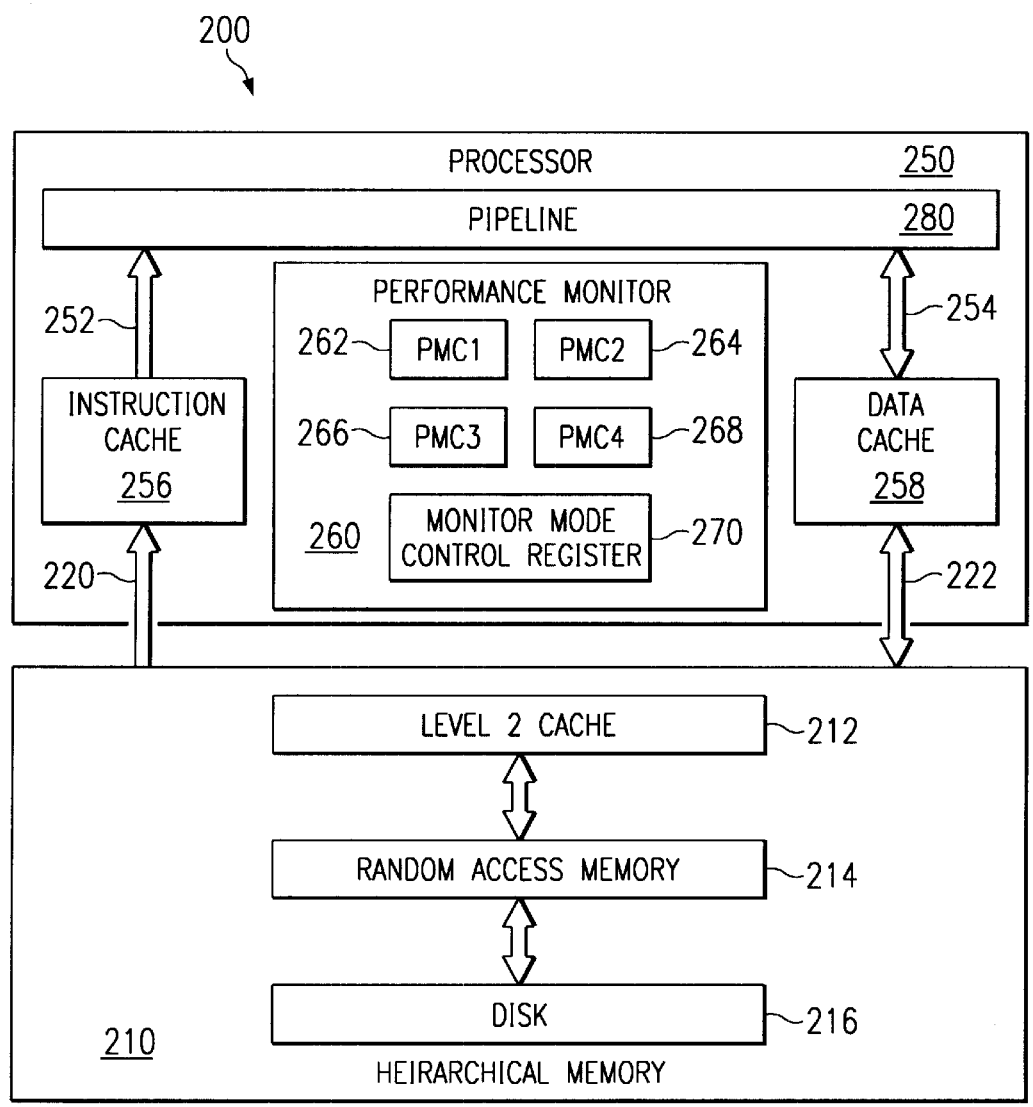
FIG. 2 is a block diagram depicting selected, internal, functional units of a data processing system for processing information in accordance with a preferred embodiment is an illustration providing an example representation of one configuration of a monitor mode control register suitable for controlling the operation of two performance monitor counters.

With reference now to FIG. 2, a block diagram depicts selected internal functional units of a data processing system for processing information in accordance with a preferred embodiment of the present invention. System 200 comprises hierarchical memory 210 and processor 250. Hierarchical memory 210 comprises Level 2 cache 212, random access memory (RAM) 214, and disk 216. Level 2 cache 212 provides a fast access cache to data and instructions that may be stored in RAM 214 in a manner which is well-known in the art. RAM 214 provides main memory storage for data and instructions that may also provide a cache for data and instructions stored on non-volatile disk 216.

Data and instructions may be transferred to processor 250 from hierarchical memory 210 on instruction transfer path 220 and data transfer path 222. Transfer path 220 and data transfer path 222 may be implemented as a single bus or as separate buses between processor 250 and hierarchical memory 210. Alternatively, a single bus may transfer data and instructions between processor 250 and hierarchical memory 210 while processor 250 provides separate instruction and data transfer paths within processor 250, such as instruction bus 252 and data bus 254.

Processor 250 also comprises instruction cache 256, data cache 258, performance monitor 260, and instruction pipeline 280. Performance monitor 260 comprises performance monitor counter (PMC1) 262, performance monitor counter (PMC2) 264, performance monitor counter (PMC3) 266, performance monitor counter (PMC4) 268, and monitor mode control register (MMCR) 270. Alternatively, processor 250 may have other counters and control registers not shown.

Processor 250 includes a pipelined processor capable of executing multiple instructions in a single cycle, such as the PowerPC family of reduced instruction set computing (RISC) processors. During operation of system 200, instructions and data are stored in hierarchical memory 210. Instructions to be executed are transferred to instruction pipeline 280 via instruction cache 256. Instruction pipeline 256 decodes and executes the instructions that have been staged within the pipeline. Some instructions transfer data to or from hierarchical memory 210 via data cache 258. Other instructions may operate on data loaded from memory or may control the flow of instructions.

Performance monitor 260 comprises event detection and control logic, including PMC1–PCM4 262–268 and MMCR 270. Performance monitor 260 is a software-accessible mechanism intended to provide detailed information with significant granularity concerning the utilization of processor instruction execution and storage control. The performance monitor may include an implementation-dependent number of performance monitor counters (PMCs) used to count processor/storage related events. These counters may also be termed "global counters". The MMCRs establish the function of the counters with each MMCR usually controlling some number of counters. The PMCs and the MMCRs are typically special purpose registers physically residing on the processor. These registers are accessible for read or write operations via special instructions for that purpose. The write operation is preferably only allowed in a privileged or supervisor state, while reading is preferably allowed in a problem state since reading the special purpose registers does not change a register's content. In a different embodiment, these registers may be accessible by other means such as addresses in I/O space. In the preferred embodiment, PMC1–PMC4 are 32-bit counters and MMCR is a 32-bit register. One skilled in the art will appreciate that the size of the counters and the control registers are dependent upon design considerations, including the cost of manufacture, the desired functionality of processor 250, and the chip area available within processor 250.

Performance monitor 260 monitors the entire system and accumulates counts of events that occur as the result of processing instructions. In the present invention, processor 250 allows instructions to execute out-of-order with respect to the order in which the instructions were coded by a programmer or were ordered during program compilation by a compiler. Processor 250 also employs speculative execution to predict the outcome of conditional branches of certain instructions before the data on which the certain instructions depend is available. The MMCRs are partitioned into bit fields that allow for event/signal selection to be recorded/counted. Selection of an allowable combination of events causes the counters to operate concurrently. When the performance monitor is used in conjunction with speculatively executed instructions in the manner provided by the present invention, the performance monitor may be used as a mechanism to monitor the performance of the processor during execution of both completed instructions and speculatively executed yet uncompleted instructions.

Figure 3:
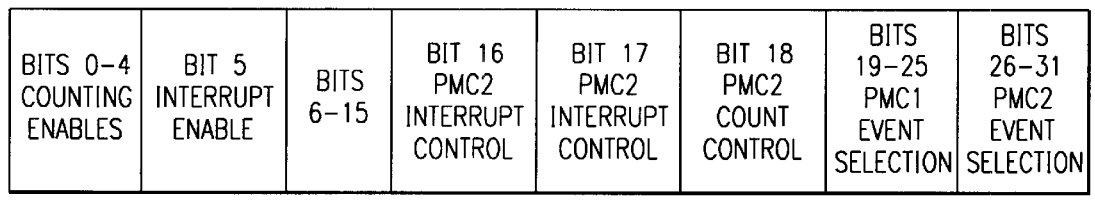
FIG. 3 is an illustration providing an example representation of one configuration of an MMCR suitable for controlling the operation of two PMCs.

With reference now to FIG. 3, an illustration provides an example representation of one configuration of an MMCR suitable for controlling the operation of two PMCs. As shown in the example, an MMCR is partitioned into a number of bit fields whose settings select events to be counted, enable performance monitor interrupts, and specify the conditions under which counting is enabled. Alternatively, an MMCR may set an initialization count value, which is not shown in the figures.

The initialization count value is both variable and software selectable. The initialization count value may be loaded into a counter when an instruction is first scheduled for execution. For example, given that the event under study is "register accesses", if the initialization count value denotes a number of register accesses for an associated instruction, then completion of the instruction allows the number of register accesses for the particular instruction to be added to the total event count in a PMC that counts all register accesses by all instructions. Of course, depending on the data instruction being executed, "complete" may have different meanings. For example, for a "load" instruction, "complete" indicates that the data associated with the instruction was received, while for a "store" instruction, "complete" indicates that the data was successfully written. A user-readable counter, e.g., PMC1, then provides software access of the total number of register accesses since PMC1 was first initialized. With the appropriate values, the performance monitor is readily suitable for use in identifying system performance characteristics.

Bits 0–4 and 18 of the MMCR in FIG. 3 determine the scenarios under which counting is enabled. By way of example, bit zero may be a freeze counting bit such that when the bit is set, the values in the PMCs are not changed by hardware events, i.e. counting is frozen. Bits 1–4 may indicate other specific conditions under which counting is performed. Bits 5, 16, and 17 are utilized to control interrupt signals triggered by PMCS. Bits 6–9 may be utilized to control time or event-based transitions. Bits 19–25 may be used for event selection for PMC1, i.e. selection of signals to be counted for PMC1. The function and number of bits may be chosen as necessary for selection of events as needed within a particular implementation.

At least one counter is required to capture data for some type of performance analysis. More counters provide for faster or more accurate analysis. If the monitored scenario is strictly repeatable, the same scenario may be executed with different items being selected. If the scenario is not strictly repeatable, then the same scenario may be executed with the same item selected multiple times to collect statistical data. The time from the start of the scenario is assumed to be available via system time services so that intervals of time may be used to correlate the different samples and different events.

Figure 4:
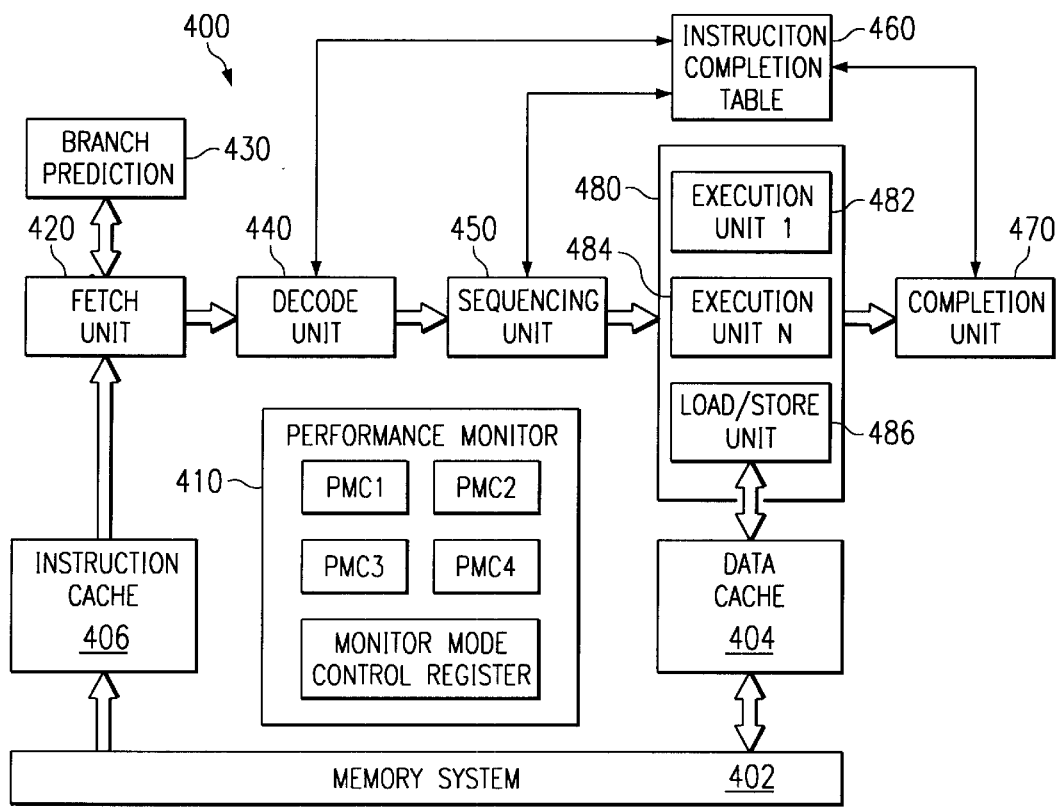
FIG. 4 is a block diagram depicting further detail of the stages of an instruction pipeline within an out-of-order, speculative execution processor.

With reference now to FIG. 4, a block diagram depicts further detail of the stages of an instruction pipeline within an out-of-order, speculative execution processor. System 400 shows memory system 402, data cache 404, instruction cache 406, and performance monitor 410, which may be similar to the hierarchical memory, data cache, instruction cache, and performance monitor shown in FIG. 3. As instructions are executed, they cause events within the processor, such as cache accesses. Performance monitor 410 contains a plurality of PMCs that count events under the control of one or more MMCRs. The counters and the MMCRs are internal processor registers and can be read or written under software control.

Fetch unit 420 retrieves instructions from instruction cache 406, which in turn retrieves instructions from memory 402. Decode unit 440 decodes instructions to determine basic information about the instruction, such as instruction type, source registers, and destination registers. Sequencing unit 450 uses the decoded information to schedule instructions for execution. In order to track instructions, completion table 460 is used for storing and retrieving information about scheduled instructions.

Out-of-order processors typically use a table to track instructions. Known as a completion buffer, a re-order buffer, or a completion table, it is a circular queue with one entry for every instruction or group of instructions. As sequencing unit 450 assigns the dispatched instruction to an associated entry in completion table 460, sequencing unit 450 assigns or associates entries to executing instructions on a first-in, first-out basis or rotating manner. As the instructions are executed, information concerning the executing instructions is stored into various fields and subfields of the associated entry of completion table 460 for the particular instruction.

Instructions executed by execution control unit 480 using one of the execution units 1-N, such as execution unit #1 482 or execution unit #N 484, may use load/store unit 486 to cause data to be read from or written to memory 402 via data cache 404. As instructions complete, completion unit 410 commits the results of the execution of the instructions, and the destination registers of the instructions are made available for use by subsequent instructions. Any instructions may be issued to the appropriate execution unit as soon as its source registers are available.

Instructions are fetched and completed sequentially until a control (branch) instruction alters the instruction flow, either conditionally or unconditionally. A control instruction specifies a new memory location from which to begin fetching instructions. When fetch unit 420 receives a conditional branch operation and the data upon which the condition is based is not yet available (e.g., the instruction that will produce the necessary data has not been executed), fetch unit 420 may use one or more branch prediction mechanisms in branch prediction control unit 430 to predict the outcome of the condition. Control is then speculatively altered until the results of the condition can be determined. If the branch was correctly predicted, operation continues. If the prediction was incorrect, all instructions along the speculative path are canceled or flushed.

Since speculative instructions can not complete until the branch condition is resolved, many high performance out-of-order processors provide a mechanism to map physical registers to virtual registers. The result of execution is written to the virtual register when the instruction has finished executing. Physical registers are not updated until an instruction actually completes. Any instructions dependent upon the results of a previous instruction may begin execution as soon as the virtual register is written. In this way, a long stream of speculative instructions can be executed before determining the outcome of the conditional branch.

Figure 5:
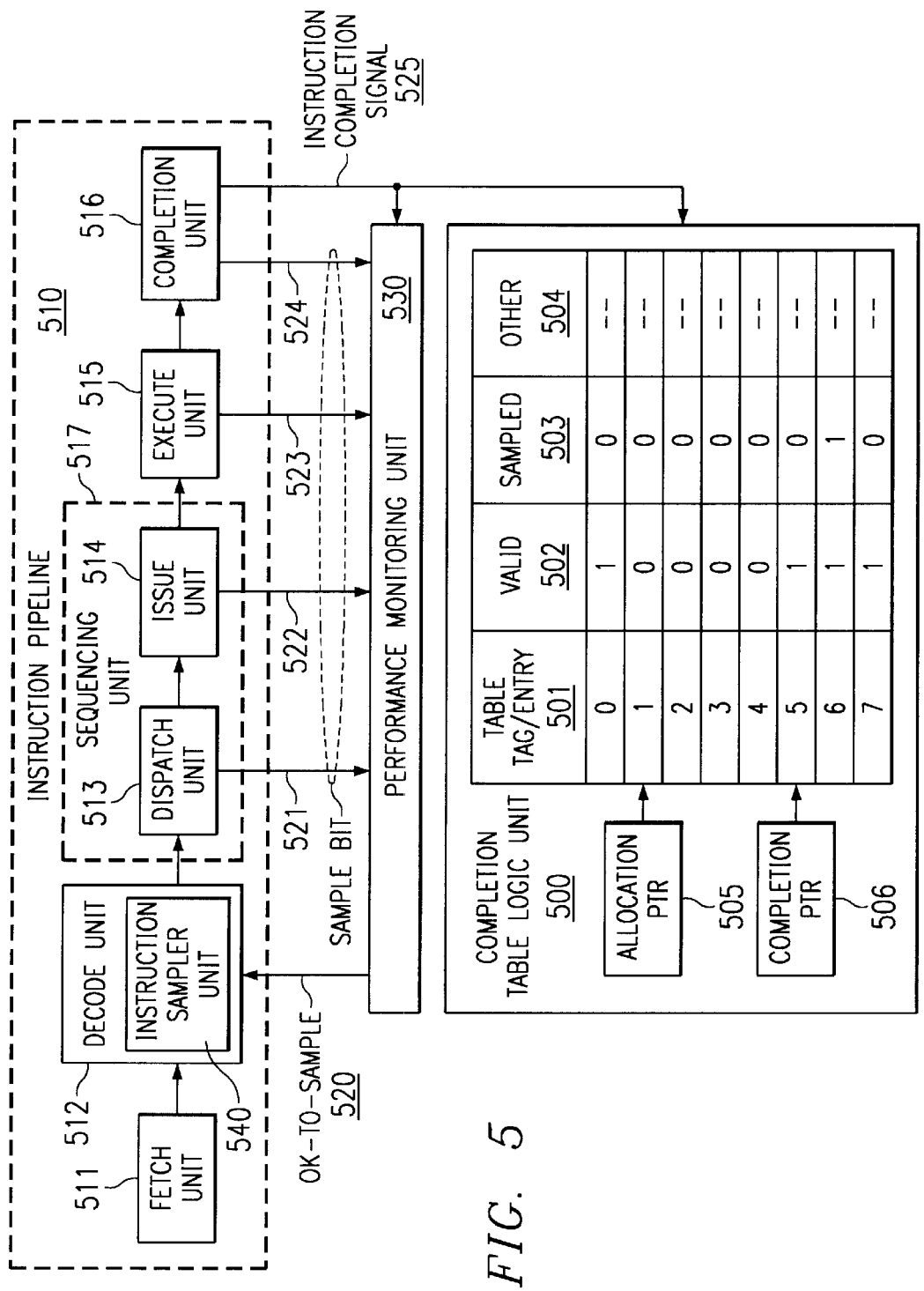
FIG. 5 is a diagram illustrating a sampled instruction monitoring unit that may be used to monitor sampled instructions.

With reference now to FIG. 5, a diagram illustrates a sampled instruction monitoring unit that may be used to monitor for sampled instructions. Completion table logic unit 500 contains an instruction completion table that is organized as a circular list with each entry in the completion table tracking a single instruction. An instruction is said to have a "tag value" equal to its index value or entry number in the completion table. Table tag/entry 501 may or may not be stored within the completion table. The tag value allows a unit within the processor to associate identified events with a particular instruction. For example, an instruction completion unit may use the tag value of the instruction whose execution is being completed to identify the completing instruction. By identifying the completing instruction, the completion table entry for the completing instruction may then be updated to indicate that the completion table entry may be reused.

Valid flag or bit 502 in the instruction completion table identifies those instructions within the instruction completion table that have not yet completed their execution. Sampled bit or flag 503 indicates that an instruction within the instruction completion table has been selected as a sampled instruction, which is explained in more detail further below. Other information associated with an instruction within the instruction completion table may be stored in the completion table, for example, in a field such as "other" 504.

Allocation pointer 505 holds the index of the next available entry in the instruction completion table. Completion pointer 506 holds the index of the oldest instruction in the instruction completion table or the index of the next instruction that is expected to complete its processing. If no completion table entries are available, then the sequencing unit of the processor stalls until an entry is available.

FIG. 5 shows exemplary data within the instruction completion table in which the completion pointer points to entry 5 and the allocation pointer points to entry 1. The instruction in entry 5 is the instruction which is expected to complete its processing next. Instructions in entries 0 and 5–7 may be waiting to execute, currently executing, or waiting to complete as indicated by their Valid flags. The next instruction to be decoded will be allocated entry 1 and the allocation pointer will increment to point to entry 2. If the allocation pointer points to entry 7 and another entry needs to be allocated, then the allocation pointer wraps to entry 0 in a circular fashion. In this example, if the allocation pointer pointed to entry 5, no more entries would be available. It should be noted that the instructions within the instruction completion table do not necessarily execute in the order in which they were placed in the completion table. Instructions are inserted into the completion table in the order that they are coded by the programmer, i.e. they are placed in the table in program-order. Instructions may execute out of order, but they must complete in the order that they entered into the completion table.

Alternatively, a single completion table entry may be allocated for a group of instructions. All of the instructions within the group may then be tracked with a single tag value.

Instruction pipeline 510 contains stages of an instruction pipeline similar to those shown in FIG. 4. Units 511–516 depict individual stages of an instruction pipeline. Fetch unit 511 fetches instructions from memory, and decode unit 512 decodes the instructions to determine the type of instruction, its operands, and the destination of its result. Dispatch unit 513 requests operands for an instruction, and issue unit 514 determines that an instruction may proceed with execution. Execute unit 515 performs the operation on the operands as indicated by the type of instruction. Completion unit 516 deallocates any internal processor resources such as the commitment of registers, that were required by the instruction. Depending upon system implementation, an instruction pipeline may have more or less stages. For example, the functions of dispatch unit 513 and issue unit 514 may be performed by a single unit, such as a scheduling unit or sequencing unit 517.

Decode unit 512 contains instruction sampler unit 540. Instruction sampling is a technique in which a single instruction is chosen, i.e. sampled, and detailed information is collected on that instruction. Instruction sampling is typically used for performance monitoring but may also be used for debug purposes. Instructions may be sampled based on a variety of selection mechanisms, each of which may be configurably controlled. An instruction may be selected at random, in which case a performance monitor may capture the instruction address after the instruction has been randomly selected. An instruction may be selected based on a general category of its instruction type, such as selecting any store instruction, or based on an operand source or operand destination. A specific type of instruction may be selected, such as a load instruction, or even more particularly, a load instruction that uses particular registers. As another alternative, an instruction may be selected based on its instruction address, which provides functionality for a debugging program to store specific instructions at specific addresses and then to allow the processor to execute the instructions without setting interrupts or traps. The above list merely provides some examples and should not be considered an exhaustive list of potential instruction sampling mechanisms.

Instructions may be chosen for sampling in the fetch or decode stage of the processor pipeline. In instruction pipeline 510 shown in FIG. 5, the instruction sampler unit 540 is embedded within decode unit 512. Instruction sampler unit 540 may receive OK-to-Sample signal 520 from the performance monitor that indicates that the next sampled instruction may be chosen. Once an instruction is chosen, the instruction is "marked" with a sample bit that accompanies the instruction through the instruction pipeline. As the sampled instruction flows through each pipeline unit or each stage of the instruction pipeline, each pipeline unit may use or output the sample bit associated with the instruction being processed by the unit to indicate that the instruction within the unit is a sampled instruction. In this manner, a non-zero sample bit output by a unit in the instruction pipeline serves to assert a signal that may be used for a variety of purposes, as explained in further detail below.

Decode unit 512 selects an instruction in the instruction stream as a sampled instruction. To indicate that an instruction has been selected, decode unit 512 may send a sampled instruction indication signal (not shown) to completion table logic unit 500, which then sets the sampled flag of the entry associated with the instruction given its instruction or table tag. Units 513–516 provide signals 521–524 using the sample bit of the instruction being processed by the unit. The sample bit from the various pipeline stages provides an effective progress indicator for the sampled instruction as it moves along the instruction pipeline, and these signals may be counted or otherwise monitored by performance monitor 530. As instructions complete, completion unit 516 provides an instruction completion signal 525 that may be used by completion table logic unit 500 to deallocate the completion table entry of the completing instruction given its instruction or table tag. Using instruction pipeline 510, completion table logic unit 500, OK-to-Sample signal 520, sample bit signals 521–524, and instruction completion signal 525, the performance monitor may monitor when an instruction has been chosen for sampling, follow the sampled instruction's progress through the instruction pipeline, and monitor when all instructions complete, especially the completion of a sampled instruction.

Figure 6:
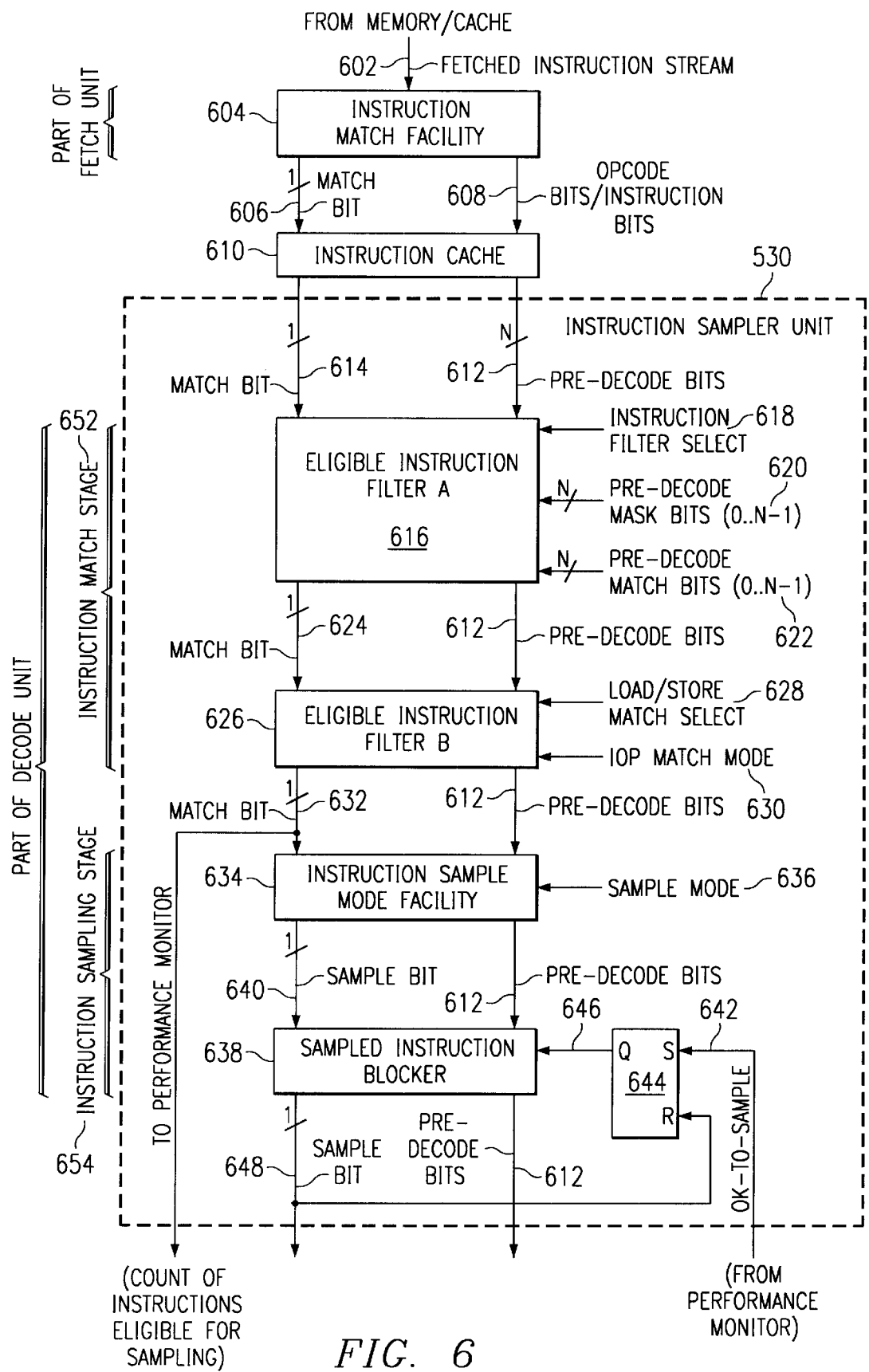
FIG. 6 is a block diagram depicting components within an instruction pipeline for selecting a sampled instruction from a population of instructions in accordance with a preferred embodiment of the present invention.

With reference now to FIG. 6, a block diagram depicts components within an instruction pipeline for selecting a sampled instruction from a population of instructions in accordance with a preferred embodiment of the present invention. Fetched instruction stream 602 is retrieved from main memory or Level 2 cache under the control of the fetch unit within the instruction pipeline. Before placing the fetched instructions into the instruction cache, the fetched instructions are passed through instruction match facility 604, which may be contained within the fetch unit or may be otherwise within the fetch logic prior to placement of the fetched instruction stream into the instruction cache. Instruction match facility 604 may be used to identify instructions by their opcode and/or extended opcode by matching the fetched instructions against selected opcodes. The matching may be performed through the use of one or more mask registers. A matched instruction is signified through a bit in the pre-decode information that is stored with the instruction in the instruction cache. Match bit 606 and opcode/instruction bits 608 are then stored in instruction cache 610 until selection for progress through the remainder of the instruction pipeline. As long as the instruction resides in the Level 1 instruction cache, its match bit remains unchanged. If the match condition being used by instruction match facility 604 changes while previously matched instructions reside within instruction cache 610, the Level 1 instruction cache should be flushed to ensure that the match bit is properly set for all instructions preparing to enter the remainder of the instruction pipeline. Otherwise, instructions residing within instruction cache 610 will have been matched using more than one condition, thereby introducing inaccuracies into any event counts by the performance monitor for matched instructions at subsequent locations within the instruction pipeline.

As instructions are retrieved from instruction cache 610, the decode unit may expand the opcode of the architected instruction, i.e. the original instruction retrieved for an executing program, into an expanded stream of instructions consisting of internal instructions with internal opcodes (IOPs). These internal opcodes form some or all of pre-decode bits 612. In the example shown in FIG. 6, pre-decode bits 612 consists of N bits. As the internal opcode flows through the instruction pipeline, its associated match bit 614 flows with the instruction through the instruction pipeline. One or more of the pre-decode bits may classify the instruction. For example, there may be several branch instructions in the architected instruction set that may be categorized using a pre-decode bit, so that 16 branch instructions are classified by setting a single pre-decode bit. These pre-decode bits may then be used by an execution unit at a later point in the instruction pipeline. It should be noted that the architected instruction stream may be transformed into an expanded internal instruction stream as many of the architected instructions may be subject to a one-to-many mapping that generates additional internal instructions.

Eligible instruction filter A 616 accepts pre-decode bits 612 and match bit 614 from instruction cache 610 or some other component within the decode unit. Eligible instruction filter A 616 may accept a variety of selection or match signals to filter the instruction stream flowing through the filter. Some instructions that flow through eligible instruction filter A 616 may already have an associated match bit 614 that has been previously set to select the instruction as a match instruction. For example, if a single original instruction is pulled from instruction cache 610 and expanded into multiple internal instructions, all of the internal instructions associated with the original instruction would generally have a match bit that is set if the original instruction residing in instruction cache 610 also had its match bit set. In other words, the plurality of match bits associated with the plurality of internal instructions would have generally values equal to the match bit of the original instruction. In any case, the purpose of eligible instruction filter A 616 is to provide the ability to select more instructions within the instruction stream as matched instructions.

Instruction filter select 618 is used to determine whether to use the pre-decode match functionality within eligible instruction filter A 616. If instruction filter select 618 is set to one, more instructions within the instruction stream may be determined to be eligible or matched instructions according to their pre-decode bits. Otherwise, if instruction filter select 618 is set to zero, eligible instruction filter B 626 sees the same match bit stream as eligible instruction filter A 616, or in other words, eligible instruction filter A 616 does not alter or set any match bits that flow through it in any manner.

Pre-decode mask 620 and pre-decode match 622 are equal in size to the number of pre-decode bits. Pre-decode mask 620 contains a mask to be used when comparing against the pre-decode field. This mask will be bitwise ANDed with the pre-decode bits before the match comparison with pre-decode match 622. Pre-decode match 622 contains a set of match bits to be used when comparing against the masked value of the pre-decode field. All pre-decode bits must match the masked pre-decode bits exactly. If so, the match bit associated with the pre-decode bits is set. To match all instructions flowing through instruction filter A 616, instruction filter select 618 should be set, pre-decode mask 620 should be set equal to zero, and pre-decode match 622 should also be set to zero. Since the masked value of the pre-decode bits results in all zero bits, the masked value will always match pre-decode match 622, and the match operation provided by eligible instruction filter A 616 will always succeed. It should be noted that the instruction stream as represented by pre-decode bits 612 passes through eligible instruction filter A 616 unmodified, as shown by pre-decode bits 612 entering eligible instruction filter B 626. However, eligible instruction filter A 616 may have modified the match bit stream, as shown by match bit 624 entering eligible instruction filter B 626 differing from match bit 614 entering eligible instruction filter A 616.

Eligible instruction filter B 626 may accept a variety of signals in order to provide filtering of the instruction stream to select more instructions from the instruction stream as eligible or matched instructions. Load/store match 628 may be asserted to set the match bit associated with all load/store instructions. IOP match mode 630 may be used to select or match against internal instructions. For example, a first mode of operation for IOP match mode 630 may be to match one internal instruction per architected instruction or original instruction. Since the instruction stream flowing through eligible instruction filter B 626 may have resulted from an expansion of the original instruction stream into an expanded internal instruction stream, a first match mode may ensure that one internal instruction per architected instruction is matched. A second mode of operation for IOP match mode 630 may match all internal instructions. A variety of match modes may be provided, and the size of IOP match mode 630 as a number of bits may vary appropriately. It should be noted that eligible instruction filter B 626 does not modify the pre-decode bits, as shown by pre-decode bits 612 passing to instruction sample mode facility 634. However, eligible instruction filter B 626 may set additional match bits for instructions that flow through it, as shown by match bit 632 being passed to instruction sample mode facility 634 and differing from match bit 624 that entered eligible instruction filter B 626.

Instruction sample mode facility 634 may accept a variety of signals to direct the sampling of instructions eligible to be selected as sampled instructions. In other words, instruction sample mode facility 634 will detect eligible instructions as provided by match bit 632 and sample the eligible instructions according to the sample mode provided by sample mode 636 or other signals. In a preferred embodiment, the match bit stream terminates at the instruction sample mode facility, which generates a sample bit stream.

A first mode of operation for instruction sample mode facility 634 may be to pick all eligible instructions as sampled instructions. Another mode of operation may be to pick some of the eligible instructions at random to be sampled instructions. A third mode of operation may be to pick the first eligible instruction as a sampled instruction, i.e. the first eligible instruction after the instruction sample mode facility receives this direction or assertion of sample mode 636.

Instruction sample mode facility 634 indicates that an eligible instruction has been selected as a sampled instruction by generating a sample bit that is associated with the instruction and subsequently flows through the remainder of the instruction pipeline with the instruction. In this manner, instruction sample mode facility 634 ensures that, for any group of instructions, the proper number of instructions have had a sample bit turned on so that subsequent units within the instruction pipeline may monitor the progress of the instruction or the performance characteristics of sampled instructions. It should be noted that instruction sample mode facility 634 does not modify the pre-decode bits of the instructions in the instruction stream, as shown by pre-decode bits 612 being passed to sampled instruction blocker 638.

Sampled instruction blocker 638 accepts pre-decode bits 612 and sample bit 640. Sampled instruction blocker 638 examines the sample bits associated with a group of instructions to ensure that only a single instruction in the remainder of the instruction pipeline is marked as a sampled instruction. If a completion table entry tag accompanies the instruction through the instruction pipeline, and multiple instructions share an entry in the completion table, then the tag value may be used as a grouping condition. The number of instructions that are analyzed or grouped for analysis may vary from one to a number instructions, and the manner in which a number of instructions are grouped may vary depending upon system implementation.

Sampled instruction blocker 638 receives direction from another component, such as the performance monitor, through OK-to-Sample signal 642. Signal 642 sets flip-flop 644 that provides signal 646 to sampled instruction blocker 638. Once sampled instruction blocker 638 selects a sampled instruction, the sample bit then resets flip-flop 644. Sampled instruction blocker 638 may not allow an instruction in the instruction stream to be marked as a sampled instruction until OK-to-Sample signal 642 is again received. In this manner, sampled instruction blocker 638 ensures that only one instruction in a group of instructions may be indicated as a sampled instruction, and sampled instruction blocker 638 also ensures that once an instruction in the instruction stream is allowed to pass as a sampled instruction, sampled instruction blocker 638 may not select another sampled instruction until directed to do so. Other mechanisms for reducing or preventing multiple sampled instructions may be provided. Sampled instruction blocker 638 then provides sample bit 648 and pre-decode bits 612 to the next stage of the instruction pipeline, e.g., the instruction scheduling unit.

It can be seen that instruction sampler unit 650 may comprise an instruction match stage 652 and an instruction sampling stage 654. In instruction match stage 652, a subset of instructions in the instruction stream flowing into the instruction pipeline may be selected as instructions eligible to be selected as sampled instructions. The eligible instructions are indicated by turning on the match bit associated with an eligible instruction. During instruction sampling stage 654, the eligible instructions are then winnowed to select a sampled instruction. In a preferred embodiment, only a single instruction may be selected as a sampled instruction at any given time within the instruction pipeline.

Hence, instruction match stage 652 generates eligible instructions whereas, in contrast, instruction sampling stage 654 reduces the eligible instructions to a single sampled instruction.

With reference now to FIGS. 7A–7B, a flowchart depicts a process for selecting a sampled instruction from an instruction stream entering an instruction pipeline in accordance with a preferred embodiment of the present invention. The process begins when instructions are fetched from memory (step 702) and optionally matched against selected opcodes (step 704). The instructions are then stored in the instruction cache along with a match bit, if necessary (step 706).

An instruction stream is pumped into the instruction pipeline (step 707), which may then be filtered using a variety of mechanisms. For example, the pre-decode bits of an instruction may be masked with a pre-decode mask (step 708), and the masked value may then be matched against a pre-decode match (step 710). To determine whether the instruction is eligible to be selected as a sampled instruction. The eligibility of the instruction may be indicated by setting a match bit for the instruction (step 712). The instruction stream may then be further filtered by comparing the pre-decode bits of an instruction against other match values, such as a match value that selects all load/store instructions (step 714), and the match bit of matched instructions is set (step 715).

A filtering unit may select other instructions in the instruction stream as eligible instructions based on other match modes provided to the filter unit, such as selecting the first internal instruction of a group of internal instructions corresponding to an architected instruction (step 716). Again, instructions are marked as eligible instructions by setting a match bit for an eligible instruction (step 718).

The instruction stream may then enter an instruction sampling stage in which instructions that have been marked as eligible instructions may then be selected as sampled instructions. The instruction stream may pass through a sample mode unit that performs sampling on the instruction stream (step 720). For example, random instructions may be selected from the eligible instructions in the instruction stream. Those instructions which are selected as sampled instructions are marked as sampled instructions using a sample bit that follows the sampled instructions through the instruction pipeline (step 722). The instruction stream then passes through a blocker unit that winnows the number of sampled instructions such that only one instruction may be marked as a sampled instruction at any given time in the remainder of the instruction pipeline (step 724). Instructions that are no longer selected as sampled instructions have their sample bit associated with the instruction set to zero or reset (step 726). The instruction stream consisting of pre-decode bits for the instruction, a sample bit associated with the instruction, and other possible information then passes to the next stage of the instruction pipeline. The process is then complete with respect to sampling and instruction using a variety of filters and sample modes.

The advantages provided by the present invention are apparent in light of the detailed description of the invention provided above. Prior art techniques that employ rudimentary queue position selection to select instructions that may introduce bias towards certain queue positions based on the manner in which the internal queue is managed. In addition, some types of instructions may be sampled more than other types, and entire classifications or categories of instructions may be missed as the selection of a type of instruction is random based on the placement of an instruction within the queue.

The present invention employs an instruction match stage and an instruction sampling stage. In the instruction match stage, a subset of instructions in the instruction stream flowing into the instruction pipeline may be selected as instructions eligible to be selected as sampled instructions. The eligible instructions are given an indicator, such as a match bit associated with an eligible instruction. Eligible instructions are selected based on a variety of selection mechanisms. During the instruction sampling stage, the eligible instructions are then winnowed to select a sampled instruction, and a variety of mechanisms may be employed to sample eligible instructions. The flexibility provided in the manner of selecting sampled instructions allows for fine granularity and control for precise performance monitoring and debug.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for selecting an instruction to be monitored within a pipelined processor, the method comprising the steps of:

fetching a plurality of instructions;

comparing each one of said plurality of instructions with at least one match condition;

marking each one of said plurality of instructions that matched said at least one match condition to generate a first plurality of marked instructions;

selecting at least one of said first plurality of marked instructions for sampling;

marking said at least one of said first plurality of marked instructions as a sampled instruction; and sampling instructions that are marked as a sampled instruction, wherein others of said first plurality of marked instructions that are not marked as a sampled instruction are not sampled, and further wherein said at least one of said first plurality of marked instructions that is marked as a sampled instruction is sampled.

2. The method of claim 1 further comprising:

marking each one of said plurality of instructions that matched said at least one match condition by setting a match bit in each one of said plurality of instructions that matched said at least one match condition; and passing the match bit associated with each one of said plurality of instructions that matched said at least one match condition.

3. The method of claim 1 further comprising:

fetching the plurality of instructions from a memory or a cache;

filtering the plurality of instructions using a match condition against an opcode of each instruction in the plurality of instructions to generate a subset of matched instructions; and storing the matched instructions in an instruction cache.

4. The method of claim 3 further comprising:

setting a match bit for each matched instruction in the subset of matched instructions;

associatively storing the match bit for each matched instruction in the instruction cache with the matched instructions.

5. The method of claim 1 further comprising:

filtering the plurality of instructions using a match condition against pre-decode bits of each instruction in the plurality of instructions to generate a subset of matched instructions.

6. The method of claim 5 further comprising:

masking the pre-decode bits of each instruction in the plurality of instructions; and filtering the masked instructions against at least one match value consisting of a set of match bits to generate a subset of matched instructions.

7. The method of claim 1 further comprising:

filtering the plurality of instructions using a match condition against an instruction type of each instruction in the plurality of instructions to generate a subset of matched instructions.

8. The method of claim 1 further comprising:

filtering the plurality of instructions using a match condition against an instruction position of each instruction in the plurality of instructions to generate a subset of matched instructions.

9. The method of claim 8 wherein the plurality of instructions comprises internal opcodes, and the instruction position is associated with a position of an instruction within a set of internal opcodes generated from an architected instruction.

10. The method of claim 1 wherein the step of sampling further comprises:

selecting all of said first plurality of marked instructions as preliminarily sampled instructions; and blocking a subset of the preliminarily sampled instructions to select a single sampled instruction.

11. The method of claim 1 wherein the step of sampling further comprises:

selecting random instructions from said first plurality of marked instructions as preliminarily sampled instructions; and blocking a subset of the preliminarily sampled instructions to select a single sampled instruction.

12. The method of claim 1 wherein the step of sampling further comprises:

selecting a sampled instruction using a sample condition against an instruction position of each instruction of said first plurality of marked instructions to generate a sampled instruction.

13. The method of claim 1 further comprising:

passing the sample bit associated with the sampled instruction through the pipelined processor with the sampled instruction in order to monitor the sampled instruction.

14. An apparatus for selecting an instruction to be monitored within a pipelined processor, the apparatus comprising:

fetching means for fetching a plurality of instructions;

filtering means for comparing each one of said plurality of instructions with at least one match condition;

marking means for marking each one of said plurality of instructions that matched said at least one match condition to generate a first plurality of marked instructions;

selecting means for selecting at least one of said first plurality of marked instructions for sampling;

marking means for marking said at least one of said first plurality of marked instructions as a sampled instruction; and sampling means for sampling instructions that are marked as a sampled instruction, wherein others of said first plurality of marked instructions that are not marked as a sampled instruction are not sampled, and further wherein said at least one of said first plurality of marked instructions that is marked as a sampled instruction is sampled.

15. The apparatus of claim 14 further comprising:

marking means for marking each one of said plurality of instructions that matched said at least one match condition by setting a match bit in each one of said plurality of instructions that matched said at least one match condition; and passing means for passing the match bit associated with each one of said plurality of instructions that matched said at least one match condition through the pipelined processor with each one of said plurality of instructions that matched said at least one match condition.

16. The apparatus of claim 14 further comprising:

fetching means for fetching the plurality of instructions from a memory or a cache;

filtering means for filtering the plurality of instructions using a match condition against an opcode of each instruction in the plurality of instructions to generate a subset of matched instructions; and storing means for storing the matched instructions in an instruction cache.

17. The apparatus of claim 16 further comprising:

setting means for setting a match bit for each matched instruction in the subset of matched instructions;

storing means for associatively storing the match bit for each matched instruction in the instruction cache with the matched instructions.

18. The apparatus of claim 14 further comprising:

filtering means for filtering the plurality of instructions using a match condition against pre-decode bits of each instruction in the plurality of instructions to generate a subset of matched instructions.

19. The apparatus of claim 18 further comprising:

masking means for masking the pre-decode bits of each instruction in the plurality of instructions; and filtering means for filtering the masked instructions against at least one match value consisting of a set of match bits to generate a subset of matched instructions.

20. The apparatus of claim 14 further comprising:

filtering means for filtering the plurality of instructions using a match condition against an instruction type of each instruction in the plurality of instructions to generate a subset of matched instructions.

21. The apparatus of claim 14 further comprising:

filtering means for filtering the plurality of instructions using a match condition against an instruction position of each instruction in the plurality of instructions to generate a subset of matched instructions.

22. The apparatus of claim 21 wherein the plurality of instructions comprises internal opcodes, and the instruction position is associated with a position of an instruction within a set of internal opcodes generated from an architected instruction.

23. The apparatus of claim 14 wherein the sampling means further comprises:

selecting means for selecting all of said first plurality of marked instructions as preliminarily sampled instructions; and blocking means for blocking a subset of the preliminarily sampled instructions to select a single sampled instruction.

24. The apparatus of claim 14 wherein the sampling means further comprises:

selecting means for selecting random instructions from said first plurality of marked instructions as preliminarily sampled instructions; and blocking means for blocking a subset of the preliminarily sampled instructions to select a single sampled instruction.

25. The apparatus of claim 14 wherein the sampling means further comprises:

selecting means for selecting a sampled instruction using a sample condition against an instruction position of each instruction of said first plurality of marked instructions to generate a sampled instruction.

26. The apparatus of claim 14 further comprising:

passing means for passing the sample bit associated with the sampled instruction through the pipelined processor with the sampled instruction in order to monitor the sampled instruction.

27. A computer program product on a computer-readable medium for use in a data processing system for selecting an instruction to be monitored within a pipelined processor, the computer program product comprising:

instructions for fetching a plurality of instructions;

instructions for comparing each one of said plurality of instructions with at least one match condition to generate a first plurality of marked instructions;

instructions for selecting at least one of said first plurality of marked instructions for sampling;

instructions for marking said at least one of said first plurality of marked instructions as a sampled instruction; and instructions for sampling instructions that are marked as a sampled instruction, wherein others of said first plurality of marked instructions that are not marked as a sampled instruction are not sampled, and further wherein said at least one of said first plurality of marked instructions that is marked as a sampled instruction is sampled.

28. A method for selecting an instruction to be monitored within a pipelined processor, the method comprising the steps of:

fetching a plurality of instructions;

matching the plurality of instructions against at least one match condition to generate instructions eligible for sampling;

sampling the instructions eligible for sampling to select a sampled instruction to be monitored while executing within the pipelined processor; and wherein the step of matching further includes filtering the plurality of instructions using a match condition against pre-decode bits of each instruction in the plurality of instructions to generate a subset of matched instructions.

29. The method of claim 28 further comprising:

masking the pre-decode bits of each instruction in the plurality of instructions; and filtering the masked instructions against at least one match value consisting of a set of match bits to generate a subset of matched instructions.

30. An apparatus for selecting an instruction to be monitored within a pipelined processor, the apparatus comprising:

first fetching means for fetching a plurality of instructions;

matching means for matching the plurality of instructions against at a least one match condition to generate instructions eligible for sampling;

sampling means for sampling the instructions eligible for sampling to select a sampled instruction to be monitored while executing within the pipelined processor; and the matching means further including second filtering means for filtering the plurality of instructions using a match condition against pre-decode bits of each instruction in the plurality of instructions to generate a subset of matched instructions.

31. The apparatus of claim 30 further comprising:

masking means for masking the pre-decode bits of each instruction in the plurality of instructions; and third filtering means for filtering the masked instructions against at least one match value consisting of a set of match bits to generate a subset of matched instructions.

* * * * *

UNITED STATES PATENT AND TRADEMARK OFFICE
CERTIFICATE OF CORRECTION

PATENT NO. : 6,574,727 B1
DATED : June 3, 2003
INVENTOR(S) : Davidson et al.

It is certified that error appears in the above-identified patent and that said Letters Patent is hereby corrected as shown below:

<u>Column 17,</u>
Line 18, after "at", delete "a".

Signed and Sealed this

Fourth Day of November, 2003

JAMES E. ROGAN
*Director of the United States Patent and Trademark Office*